Oct. 8, 1929.  D. D. MAURER  1,731,076
TRANSMISSION
Filed Aug. 30, 1927  2 Sheets-Sheet 2
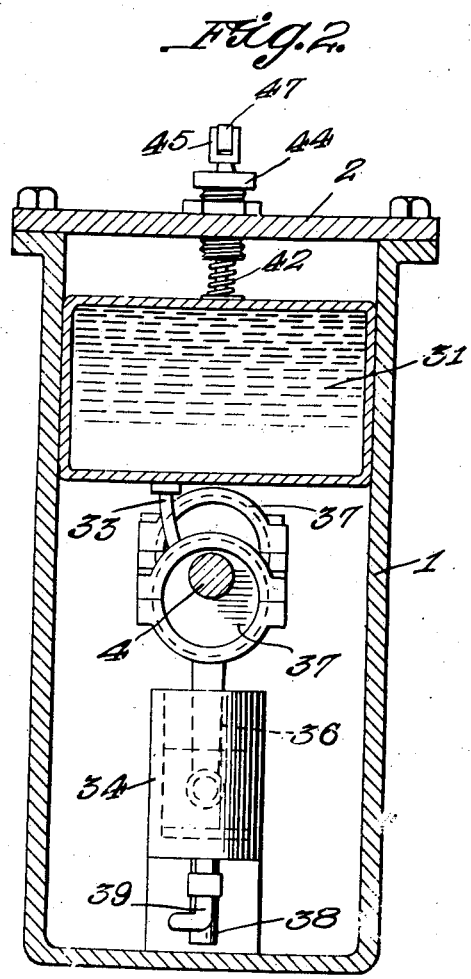
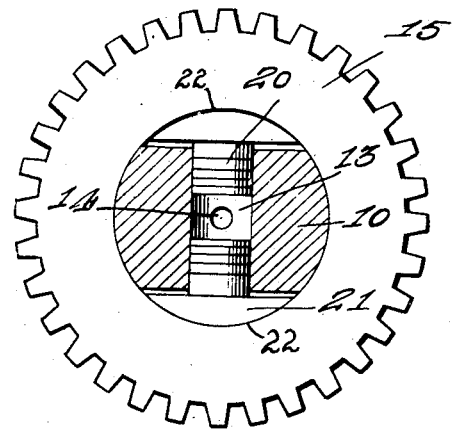
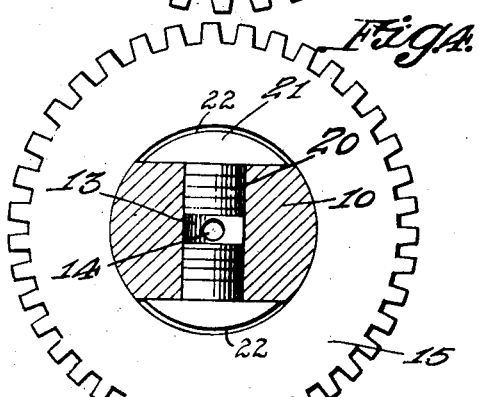
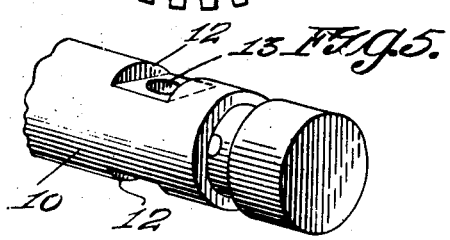
D. D. Maurer,
INVENTOR
BY Victor J. Evans
ATTORNEY Patented Oct. 8, 1929

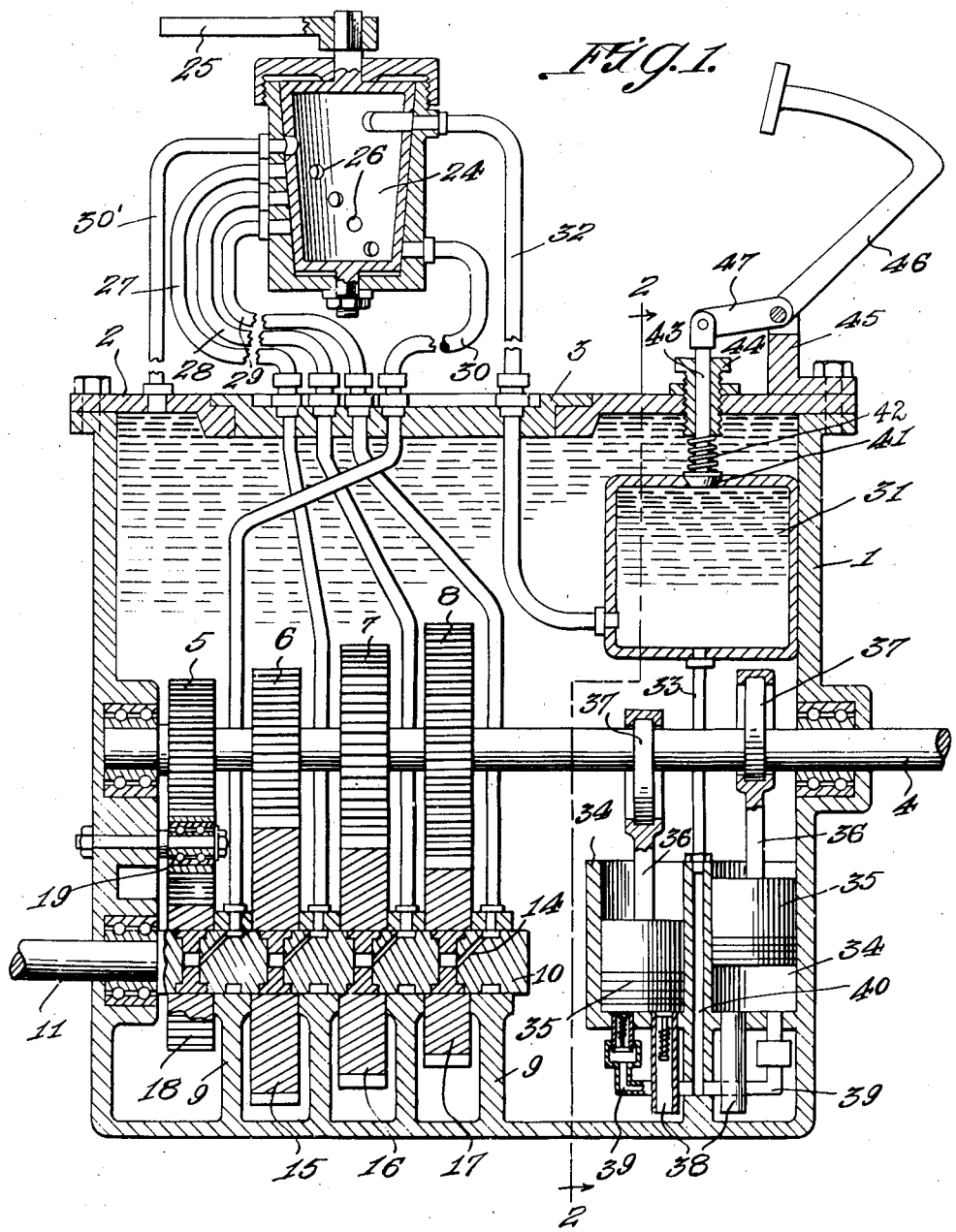

1,731,076

UNITED STATES PATENT OFFICE

DONALD D. MAURER, OF WALNUT CREEK, CALIFORNIA

TRANSMISSION

Application filed August 30, 1927. Serial No. 216,471.

This invention relates to transmission gearing, and its general object is to provide a fluid actuated transmission for motor vehicles, that includes two or more sets of gears arranged in consant mesh with each other with fluid control means for selectively operating any one gear of one set, whereby such operation will be transmitted to the companion gear of the cooperating set.

A further object of the invention is to provide a novel gear clutching plunger that is controlled by fluid, and is engageable with the inner face of gears to operate the same for driving the shaft carrying the plungers.

Another object of the invention is to provide a fluid transmission for motor vehicles, that is practically noiseless, extremely easy to control, simple in construction, contains few parts, is inexpensive to manufacture and is efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying draw ings wherein like characters denote like or corresponding parts throughout the several views, and in which:

Figure 1 is a vertical sectional view taken through the transmission forming the subject matter of the present invention and showing parts in elevation.

Figure 2 is a sectional view taken on line 2—2 of Figure 1.

Figure 3 is a transverse sectional view taken through the clutch plunger carrying shaft and illustrating the clutch plungers in operative position.

Figure 4 is a similar view with the clutch plungers in their inoperative position.

Figure 5 is a perspective view of one end of the clutch plunger carrying shaft or driven shaft of the vehicle.

Referring to the drawings in detail the reference numeral 1 indicates the transmission gearing housing which includes a removable top 2 having a cover 3 therefor.

Extending through one wall of the housing and having its end received in a bearing mounted in the opposite wall is a shaft 4 having connection with the motor of the vehicle and is driven thereby as will be apparent. The portion of the shaft passing through the first mentioned wall is also mounted in a bearing as shown in Figure 1 of the drawings. Fixed to this shaft adjacent one end and arranged in equi-distantly spaced relation with respect to each other are spur gears 5, 6, 7 and 8 which increase in size from the gear 5 in the usual manner. Rising from the bottom of the housing are uprights 9 which have their upper ends formed to provide bearings to accommodate the enlarged inner end 10 of a driven shaft 11 of the motor vehicle, and this shaft 11 is mounted in a bearing arranged in the wall of the casing as shown. The enlarged portion 10 is formed with a plurality of opposed recesses 12 arranged in pairs and communicating with the recesses are transverse bores 13, and this enlarged portion is further provided with annular grooves from which extend at an inclination therefrom passages 14 which communicate with the bores 13 as best shown in Figure 1. Disposed between the bearings of the uprights and in a manner to be arranged about the recesses 12 are spur gears 15, 16 and 17 which are in constant mesh with the gears 6, 7 and 8, while a spur gear 18 is also disposed about the enlarged portion and one pair of recesses formed therein and this spur gear 18 is in mesh with a pinion 19 which is in mesh with the spur gear 5.

Carried by the enlarged portion 10 and including stems 20 are clutch plungers 21 having their stems 20 mounted in the bores while the remaining portion which is formed with an arcuate outer face is disposed in the recesses 12. The arcuate outer face 22 of the plungers follow the curvature of the inner face of the gears as best shown in Figures 3 and 4 of the drawings and these clutch plungers are arranged in pairs for engagement with the inner face of the gears upon opposed sides thereof as will be apparent.

The clutch plungers are fluid operated, and are controlled through the instrumentality of a valve which may be disposed on the steering wheel of the vehicle or in any place convenient to the driver, and said valve includes a casing having mounted for slidable movement therein a hollow core 24 which is tapered as shown and which is engageable with the inner walls of the casing. The core has rising therefrom a stem and is operated through the instrumentality of a handle 25 received by said stem. The core is further provided with a plurality of openings 26 preferably arranged at an upward inclination therein, as shown in Figure 1, and which are adapted to register with openings arranged in the casing. Mounted in the openings arranged in the casing are the ends of pipe lines 27, 28, 29 and 30 which have their opposite ends arranged in the bearings of the uprights 9 so as to be in communication with the grooves arranged in the enlarged portion 10 of the drive shaft in a manner whereby oil will be supplied between the stems of the clutch plungers through the medium of the passages 14. A pipe line 30' connects the valve with the housing so as to establish communication therebetween.

Arranged in the housing preferably adjacent one upper corner thereof is a receptacle 31 which is likewise in communication with the valve through the instrumentality of a pipe line 32. This receptacle 31 is provided with a pipe 33 depending therefrom and which connects with a pump for supplying fluid to the receptacle under pressure. This pump includes a pair of cylinders 34 which has mounted therein pistons 35 having connection with the shaft 4 by rods 36, and straps which are carried by disk wheels 37 eccentrically mounted upon the shaft 4 as shown in Figure 1. Spring pressed intake valves 38 are provided for the cylinders, while outlet valves 39 are in communication with said cylinders, and with a passage 40 which receives the lower end of the pipe 33. By this construction, it will be obvious that fluid under pressure will be supplied to the receptacle 31 when the shaft 4 is in operation, and in order to relieve this pressure, I have provided a valve 41 having a spring 42 surrounding its stem 43 thereof, and the tension of this spring is controlled by a sleeve nut 44 threadedly mounted in the top of the housing and engageable with the upper convolution of the spring, while its lower convolution engages the head of the valve. Secured to one of the bolts which fixes the top 2 to its housing is a support 45 having a bifurcated upper end within which is mounted the shank of a foot pedal 46 and a link 47. The link 47 is pivotally secured to the upper end of the stem 43, and it will be apparent that when pressure is applied to the foot pedal, the valve will be raised and therefore the pressure will be relieved in the receptacle 31.

From the above description and disclosure of the drawings, it will be obvious that the housing is adapted to be filled with oil or other similar fluid and upon starting the motor of the vehicle, the shaft 4 will be put into motion and result in filling the receptacle 31 with the fluid in the housing 1, and when it is desired to start the vehicle, pressure is applied to the foot pedal, so as to relieve any pressure in the system and the valve core 24 is rotated for arranging the desired opening in communication with one of the pipe lines 27 to 30 inclusive it depending of course upon which gear is selected, but if it is desired to put the vehicle in forward motion, the opening for the pipe line 27 is selected, which will cause the fluid to pass through said pipe line 27, to its groove in the enlarged portion 10, thence through its passage 14 so that the fluid will be disposed between the stems of the plungers for the gear 15. The fluid will cause the plungers to separate and engage the gear 15 and will result in the gear 15 rotating the drive shaft as will be apparent. The spur gears 5 and 18 and their pinion 19 are the means for reversing the vehicle, and it will be obvious that the operation just described will be applicable to the gear 18 for operating the drive shaft from the gear 5 and through the pinion 19.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a transmission device, a housing, a driving shaft arranged in said housing, graduated spur gears fixed to said driving shaft in spaced relation thereon, a driven shaft arranged in said housing and being provided with recesses arranged in opposed pairs with transverse bores communicating with said recesses, gears loosely mounted on said driven shaft and being in constant mesh with some of the gears first mentioned, a reverse gear loosely mounted on the driven shaft, a pinion in constant mesh with the reverse gear and the remaining gear first mentioned, clutch plungers arranged in said bores and having portions disposed in said recesses with arcuate shape faces, a receptacle in said housing, means for supplying fluid under pressure to said receptacle from said housing, valve control means for introducing the fluid under pressure from said casing into said bores for disposing the arcuate shaped faces of selected plungers in contacting engagement with the gears for rotating said driven shaft, and means for relieving said pressure.

2. In a transmission gearing a driving shaft, spur gears secured to said shaft, a driven shaft, spur gears loosely mounted on said driven shaft and being in constant association with the gears of the driving shaft, an enlarged portion formed with said driven shaft and carrying said loosely mounted gears, said enlarged portion being provided with recesses disposed in pairs and communicating with transverse bores with passages in said enlarged portion communicating with said bores at one end and annular grooves arranged in said enlarged portion at the opposite ends thereof, clutch plungers disposed in pairs and having their stems arranged in said bores in spaced relation with respect to each other, arcuate shaped portions included in said clutch plungers and engageable with the inner face of the loosely mounted gears, and means for selectively operating the clutch plungers.

In testimony whereof I affix my signature.

DONALD D. MAURER.